Patented Oct. 28, 1930

1,779,551

UNITED STATES PATENT OFFICE

BORIS N. LOUGOVOY, OF MONTCLAIR, NEW JERSEY

WHITE RESIN AND PROCESS OF MAKING SAME

No Drawing. Application filed December 10, 1923, Serial No. 679,754. Renewed June 15, 1925.

This invention relates to a resinous product and relates particularly to a white composite resin obtained by reacting on a phenolic substance such as phenol and cresol and urea or analogous compounds with formaldehyde or other appropriate aldehyde in the presence of a basic or acid substance serving as a catalyst or accelerating agent, the reaction being preferably carried out in an acid medium.

It is well known that resins made by reacting on ordinary phenol for example with formaldehyde have the undesirable property of turning red or pink on exposure to light. The preferred object of the present invention is to prepare a white resin which does not undergo such a change.

Various procedures are hereinafter given which enable desirable light colored or white resins to be prepared which are substantially unaffected by light.

*Example A.*—100 parts by weight of phenol, 25 parts urea and 160 parts of 40 per cent formaldehyde solution were boiled in an open flask in the presence of about 1 part of concentrated hydrochloric acid. After boiling for a short time a white mass separated and the boiling was continued for 15 minutes. When cold a white, rather brittle porcelain-like soluble resin was obtained. It was washed first with a 2 per cent solution of sodium carbonate and then with water. The yield of the resin was 178 parts. This resin was opaque and pure white in color. It was exposed to sunlight for a period of nearly two months and during that time there was no discoloration. The opacity of the exterior layers disappeared and a white glass-like coating resulted. This appears to be due to the removal of a small amount of moisture present in the mass.

*Example B.*—100 parts phenol, 25 parts urea and 100 parts of ordinary aqueous formaldehyde of 40 per cent strength were heated to the boiling point in the presence of approximately 2 parts of sulphuric acid of 50 per cent strength. The heating was carried out under a reflux condenser for a period of 15 minutes. A white resin resulted on cooling which did not harden as quickly as that described in Example A. It remained a semi-solid rubbery body for a few hours but gradually hardened on standing over night to form a mass having a porcelain-like appearance. The product was washed with sodium carbonate solution and water as in the case of Example A. On exposure of sample B to sunlight for a period of nearly two months no discoloration was observed. It retained its same initial pure white appearance.

With reference to the solubility of these resins it may be noted that the foregoing are insoluble in water, ether or benzol. They are only very slightly soluble in hot methyl or ethyl alcohol. Slowly soluble in the cold and quickly on warming in acetone. They also are slowly soluble in the cold, and dissolve rapidly on warming, in certain solvent mixtures such as equal parts of acetone and methyl or ethyl alcohol. Likewise in equal parts of benzol and methyl or ethyl alcohol. The solutions obtained were colorless and perfectly transparent. A solution of resin in acetone and alcohol, and in benzol and methyl alcohol dissolved nitrocellulose. Linseed oil could be added to the benzol-alcohol solution in small amount. Tung oil did not mix as readily. Some of these solutions can be applied to wood or other surfaces to make light colored coating compositions.

*Example C.*—White composite resin was prepared by boiling for 15 minutes a mixture of 100 parts by weight of phenol, 20 parts urea and 135 parts of 40 per cent formaldehyde solution slightly acidified with hydrochloric acid. The resin obtained as well as the water separated in the reaction were examined for the presence of unconverted substances. The resin dissolved in alcohol, benzol mixture, did not show any acid reaction with methyl orange nor did it give any biuret reaction. It did not give any ammonical odor on strong heating, nor any phenolic odor. Tests with ferric chloride showed only a faint greenish gray coloration.

*Example D.*—A mixture of 50 parts phenol, 50 parts urea and 115 parts of 40 per cent formaldehyde solution, slightly acidified with hydrochloric acid, was slightly warmed when a vigorous reaction occurred and the amount of heat given off was sufficient to keep the liquid boiling for several minutes. At the end of this time a white solid resinous body separated from the hot solution. The product obtained had a glossy surface and a porous structure and was almost infusible on the hot plate. It was insoluble in water and ordinary organic solvents. This resin was exposed to sunlight for a period of about two months and no discoloration was in evidence.

Solutions obtained as above by dissolving the soluble form of this resin in an appropriate solvent and slowly evaporating yielded a transparent colorless fusible resin. When strongly heated this is slightly yellowed or discolored by such heat treatment. It is best to carry out the reaction to avoid the presence of any free phenol.

The addition of hexamethylenetetramine to such solutions of the resin yields on evaporation a product which hardens on baking somewhat more quickly than those to which the hexa is not added. The latter however are of better color as the presence of hexamethylenetetramine appears to have a slight discoloring action on exposure to heat.

*Example E.*—In another case cresylic acid was treated with a slight excess of acetic anhydride in the presence of a trace of sulphuric acid, the reaction being carried out in the cold. The acetate so obtained was mixed, without purification, with about an equal volume of 40 per cent formaldehyde solution. The liquid at first separated into two layers but after boiling for a few minutes a clear, colorless solution resulted which on baking afforded a light colored slightly greenish resin. When the above acetate solution was mixed with paraform an exothermic reaction took place almost instantaneously with the formation of a greenish gray resinous body. Using phenol in place of tar acid or cresylic acid the resin has a tendency to be more reddish in color. The addition of urea to phenyl acetate and subsequent treatment with formaldehyde gave a resin much lighter in color which did not turn red on baking or on long exposure to light. Such a resin may be obtained in a fusible form soluble in a mixture of alcohol and benzol.

In one case urea was added to the acetate solution containing a trace of acid. Upon slight warming all the urea dissolved. To the clear solution thus obtained a 40 per cent solution of formaldehyde was added in one case and in another case paraform in powdered form was introduced. In the latter case heat was evolved immediately with the separation of a rubbery substance which hardened to a firm resin.

What I claim is:—

1. A composition comprising the resinous material obtained from phenol, formaldehyde, and urea, incorporated with hexamethylenetetramine.

2. A product obtained by baking the resinous material obtained from phenol, formaldehyde, and urea, incorporated with hexamethylenetetramine.

3. A process which comprises forming a resinous material from urea, formaldehyde, and phenol, and incorporating hexamethylenetetramine therewith.

4. A process which comprises forming a resinous reaction product from urea, formaldehyde, and phenol, adding hexamethylenetetramine thereto, and then baking the material.

BORIS N. LOUGOVOY.